United States Patent [19]
Holding

[11] Patent Number: 6,145,634
[45] Date of Patent: Nov. 14, 2000

[54] ELECTRICALLY-OPERATED DISC BRAKE ASSEMBLIES FOR VEHICLES

[75] Inventor: Keith Lawrence Holding, Birmingham, United Kingdom

[73] Assignee: Lucas Industries public limited company, United Kingdom

[21] Appl. No.: 09/051,524

[22] PCT Filed: Oct. 1, 1996

[86] PCT No.: PCT/GB96/02462

§ 371 Date: Jul. 24, 1998

§ 102(e) Date: Jul. 24, 1998

[87] PCT Pub. No.: WO97/13988

PCT Pub. Date: Apr. 17, 1997

[30] Foreign Application Priority Data

Oct. 9, 1995 [GB] United Kingdom .................. 9520616

[51] Int. Cl.$^7$ ................................................ F16D 55/08
[52] U.S. Cl. .................................... 188/72.8; 188/72.1
[58] Field of Search ....................... 188/72.1, 72.8, 188/158, 72.7, 71.9, 162; 310/77, 80

[56] References Cited

U.S. PATENT DOCUMENTS

| 4,014,411 | 3/1977 | Troester | 188/72.6 |
|---|---|---|---|
| 4,392,557 | 7/1983 | Franke | 188/71.9 |
| 4,836,338 | 6/1989 | Taig | . |
| 4,865,162 | 9/1989 | Morris et al. | . |

FOREIGN PATENT DOCUMENTS

| 0 275 783 | 7/1988 | European Pat. Off. . |
|---|---|---|
| 1 575 876 | 1/1970 | Germany . |
| 19519310A1 | 11/1996 | Germany . |

*Primary Examiner*—Michael Mar
*Assistant Examiner*—Pamela J. Lipka
*Attorney, Agent, or Firm*—MacMillan, Sobanski, & Todd, LLC

[57] ABSTRACT

In an electrically-operated disc brake assembly for a vehicle in which a friction member (10) is applied to a brake disc by a brake-applying means including an electric motor (5) which forms part of the assembly and a linear actuator (15) in the form of a screw device apply an axially directed brake-applying force to the friction member (10) in response to operation of the motor (5), the linear actuator (15) comprises differential screws (16, 19) which translate rotation of the motor (5) into axial movement of the friction member (10) in a brake-applying, direction.

13 Claims, 2 Drawing Sheets

ELECTRICALLY-OPERATED DISC BRAKE ASSEMBLIES FOR VEHICLES

CROSS-REFERENCE TO RELATED APPLICATIONS

This application is the national stage of International Application PCT/GB96/02462 filed on Oct. 1, 1996 and claims priority to Great Britain Application No. 9520616.5.

BACKGROUND OF THE INVENTION

This invention relates to improvements in electrically-operated disc brake assemblies for vehicles of the kind in which a friction member is adapted to be applied to a rotatable brake disc by a brake-applying means including an electric motor which forms part of the assembly, and linear actuator means in the form of a screw device are adapted to apply an axially-directed brake-applying force to the friction member in response to operation of the motor.

A brake of the kind set forth is known from EP-A-0 339 024. In the brake of EP-A-0 339 024 the electric motor is used to drive an input to a reduction gearbox, and the gearbox is adapted to translate the high speed movement of the motor into a controlled high torque output to the screw device. In the brake disclosed in EP-A-0 339 024, the reduction gearbox typically has a ratio of 115:1. Such a high gear reduction is required in order to provide a suitable control of the clamp force from the high speed low torque, electric motor. Gearboxes on this type are by their nature very large and complex. The gearbox disclosed in EP-A-0 339 024 is of an epicyclic design having many individual components. The output from the gearbox is operatively connected to the screw device, disclosed in EP-A-0 339 024 as a ball screw In an attempt to reduce the overall package size and the part count. with consequent reduction in mass and in order to provide a more compact assembly, it has been proposed in EP-A-0 275 783 to omit the gearbox and achieve all necessary reduction requirements by modifying the linear actuator to incorporate differential gearing. Specifically in EP-A-0 275 783 the motor is offset radially from the axis of the armature and drives a spur gear having a first power take-off, and a second power takeoff. Each power take-off is provided with a different number of teeth to drive co-operating members of the linear actuator at different speeds, thereby achieving relative movement between the components of the screw device. In this construction considerable radial space is required to accommodate the motor and the spur gear, and the drive mechanism is not incorporated in the actuator itself.

According to our invention in an electrically-operated disc brake assembly of the kind set forth for vehicles, the linear actuator comprises a screw mechanism adapted to translate rotation of the motor into axial movement of the friction member in a brake-applying direction.

Since a gearbox is omitted, inertia forces applied to the assembly are reduced, and the part count is also substantially reduced. We are also able to provided an assembly which is more compact, both axially and radially.

Preferably the screw mechanism comprises differential screws, and the use of very fine differential screws enables us to produce very fine pitch control, suitably 0.1 mm pitch.

The differential screws may comprise any convenient known arrangements. For example we can provide two-opposite hand threads on a single shaft, or the same hand threads on independent shafts. In another construction the differential screws may comprise concentric threading.

In a preferred construction a piston for applying the friction member to the disc works in a bore in a limb in a caliper, is keyed against rotation, and is internally screw-threaded, the armature of the electric motor is keyed to a drive member of differential outline having a first axially extending screw portion of smaller diameter screwed through a stationary nut, and a second axially extending screw-threaded portion of greater diameter in screw-threaded engagement with the piston, the threads on the first and second portions being of different pitch.

Preferably the pitch of the threads of the first portion is greater, suitably by 0.1 mm, than that of the threads of the second portion, whereby the resultant movement of the piston in an axial direction is equivalent to a pitch or ratio of 0.1 mm when the motor is rotated.

Preferably the armature of the motor is of cylindrical outline and surrounds the first portion, and the drive member has a longitudinal extending slot which slidably receives a diametrically extending key to permit movement of the drive member in an axial direction in response to rotation of the drive member by the motor.

When the caliper is of the single-sided reaction type, the piston is keyed to the friction member to prevent it from rotating, and the caliper moves bodily in an axial direction to apply a second friction member to the opposite face of the disc as the piston moves towards the disc in a brake-applying direction.

The screw-threaded engagements may be plain, ball screws, or roller screws.

DETAILED DESCRIPTION OF THE INVENTION

Figure 1:
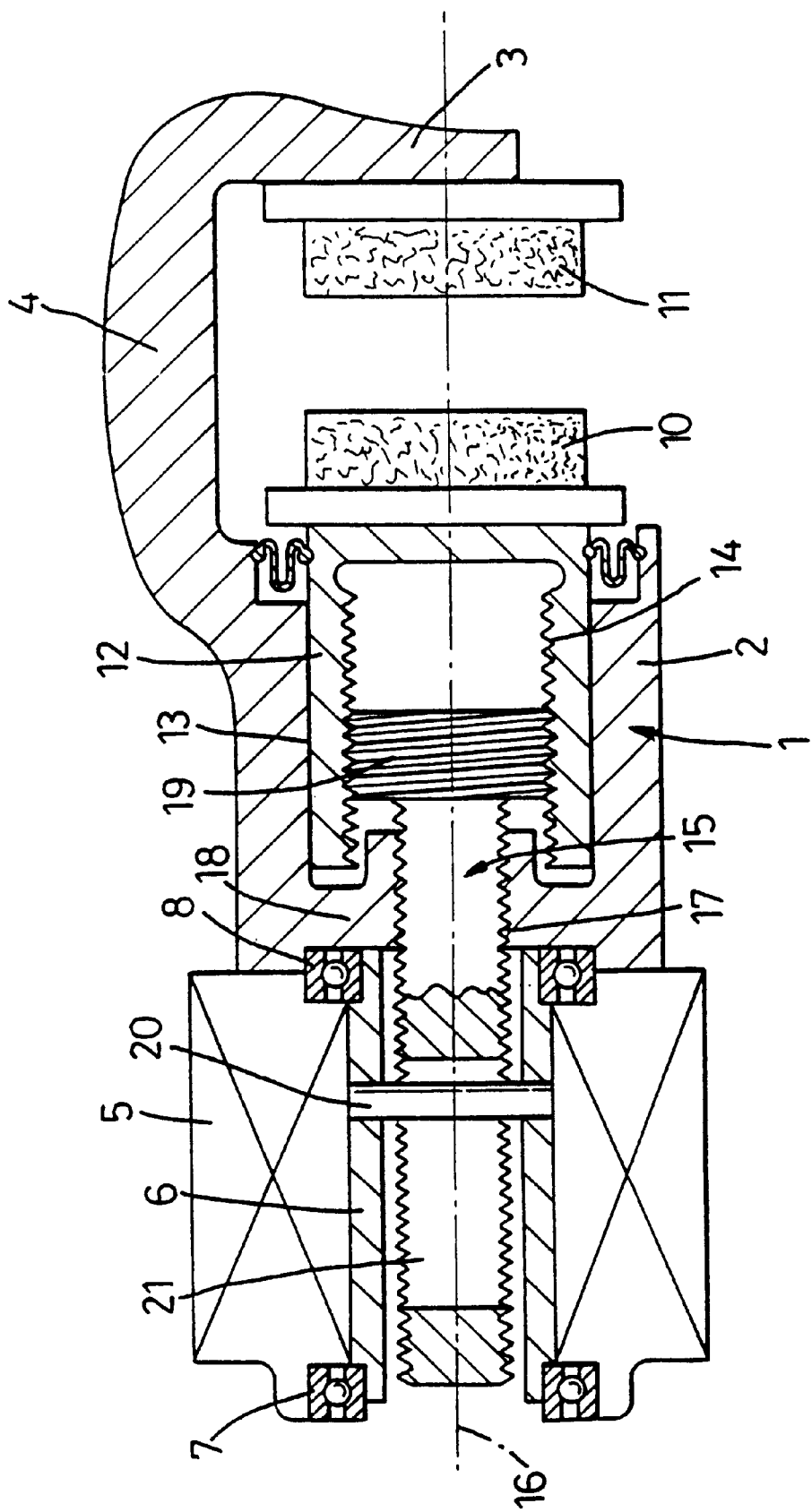
FIG. 1 is a longitudinal sectional view of an electrically operated disc brake assembly according to the invention.

One embodiment of our invention is illustrated in fig. 1 of the accompanying drawings which is a longitudinal section through an electrically operated disc brake assembly comprising a caliper of the single-sided sliding type.

The brake illustrated in the drawing comprises a caliper 1 of generally U-shaped outline comprising opposed limbs 2 and 3 adapted to straddle the periphery of a rotatable disc (not shown) and interconnected by a bridge piece 4. The caliper 1 is mounted for sliding movement on a stationary mounting member adjacent to one face of the disc and in which the limb 2 is slidably engaged.

An electrical motor 5 is mounted on the caliper 1. Specifically the motor 5 is clamped against the outer end face of the limb 2 remote from the disc. The motor 5 includes a hollow armature 6 of cylindrical outline which is rotatably mounted at opposite ends on spaced roller bearings 7 and 8.

A pair of friction members 10 and 11 are mounted in the caliper. Specifically the friction member 10 is guided for movement towards and away from the disc between guide surfaces in the limb 2 and which take the drag on the friction member 10 and prevent it from rotating with respect to the caliper. The friction member 11 is carried by the inner face of the limb 3. The friction member 10 is adapted to be applied to the disc by means of a hollow piston 12 which works in a bore 13 in the limb 2. The piston 12 is keyed to the friction member 10 so that it is also held against rotation with respect to the bore 13. The piston 12 is of cup-shaped outline and is screw threaded internally at 14.

Rotation of the armature 6 acts through a screw mechanism comprising very fine differential screws to cause axial movement of the piston 12 in the bore 13. As illustrated the differential screws comprise a drive member 15 defined by a single shaft and comprising a first threaded portion 16 of smaller diameter which is surrounded by the armature 6. The threaded portion 16 has a screw threaded engagement through a threaded bore 17 extending through a wall 18 at the end of the limb 2 remote from the disc. Since the caliper 1 is held against rotation by the mounting member, the wall 18 defines and acts as, a stationary nut. An externally screw threaded portion 19 of greater diameter, and integral with the screw-threaded portion 16 has a screw threaded engagement with the internal screw threads 14 of the piston 12.

The pitch of the threads of the first portion 16 is greater, suitably by 0.1 mm, than that of the threads of the second portion 19.

The motor 5 drives the drive member 15 by means of a drive pin 20. The pin 20 extends diametrically across the armature 6 and is received in an axially extending diametral slot 21 in the portion 16 of the drive member 15, which is of smaller diameter.

When the motor 5 is operated the drive member 15 rotates and the portion 16 moves axially toward from the disc with simultaneous rotation of the portion 19 causing the piston 12 to move axially toward the portion 16. However, since the portion 16 has threads with a greater pitch than the portion 19, the piston 19 moves towards the disc, thereby to apply the friction member 10 to its adjacent face. The reaction on the caliper 1 causes it bodily to move axially in the opposite direction, whereby the pad 11 is applied to the opposite, outer, face of the disc.

By employing "fine threads" of different pitch, resultant movement of the piston 12 is equivalent to a pitch or ratio of 0.1 mm when the drive member 15 is rotated. That is, after each rotation of the shaft, the shaft is moved x mm toward the disc (where x is the pitch of the threads of the portion 16). Assume, for example, the pitch of the threads on the portion 19 is 0.1 mm less than the pitch of the threads on the portion 16. As the shaft rotates, the portion 19 is screwed into the piston 12, moving the piston 12 (x mm–0.1 mm) relatively toward the portion 16, resulting in a net 0.1 mm movement of the piston toward the disc.

To release the brake the motor 5 is driven in the opposite direction, causing the portion 16 to advance away from the disc with respect to the nut 18, and the piston 12 to be withdrawn, axially, in the bore 13.

As illustrated the screws comprise plain threads. In modification they could be replaced by ball screws, or roller screws.

Figure 2:
FIG. 2 is a view of a shaft of a brake assembly according to the invention, having two opposite hand threads provided thereon.

In a modification of the differential screws described above two opposite hand threads are provided on a single shaft, as shown in FIG. 2. Alternatively the same hand threads could be provided on independent shafts.

In another construction the differential screws comprise concentric threading.

What is claimed is:

1. An electrically-operated disc brake assembly for vehicles in which a friction member is adapted to be applied to a rotatable brake disc by a brake-applying means including an electric motor which forms part of said assembly, and linear actuator means adapted to apply an axially-directed brake-applying force to said friction member in response to operation of said motor, wherein said linear actuator comprises a screw mechanism adapted to translate rotation of said motor into axial movement of said friction member in a brake-applying direction, and said screw mechanism comprises differential screws arranged concentrically about a common axis, and wherein said screw mechanism comprises two opposite hand threads on a single shaft.

2. A disc brake assembly as claimed in claim 1, wherein said differential screws are selected from the group consisting of plain, ball screws, and roller screws.

3. An electrically-operated disc brake assembly for vehicles in which a friction member is adapted to be applied to a rotatable brake disc by a brake-applying means including an electric motor which forms part of said assembly, and linear actuator means adapted to apply an axially-directed brake-applying force to said friction member in response to operation of said motor, wherein said linear actuator comprises a screw mechanism adapted to translate rotation of said motor into axial movement of said friction member in a brake-applying direction, and said screw mechanism comprises differential screws arranged concentrically about a common axis, and wherein a piston for applying said friction member to said disc works in a bore in a limb in a caliper, is keyed against rotation, and is internally screw-threaded, and wherein an armature of said electric motor is keyed to a drive member of differential outline having a first axially extending screw portion of smaller diameter screwed through a stationary nut, and a second axially extending screw portion of greater diameter in screw-threaded engagement with said piston, threads on said first and second portions being of different pitch.

4. A disc brake assembly as claimed in claim 3, wherein the pitch of the threads of said first portion is greater than that of the threads of said second portion, whereby to achieve a resultant movement of the piston in an axial direction.

5. A disc brake assembly as claimed in claim 4, in which the pitch of threads of said first portion is greater by substantially 0.5 millimeters than that of said threads of the second portion to achieve a resultant pitch or ratio of 0.1 millimeters when said motor is rotated.

6. A disc brake assembly as claimed in claim 3, wherein said armature of said motor is a cylindrical outline and surrounds said first portion, and said drive member has a longitudinal extending slot which slidably receives a diametrically extending key to permit relative movement of said drive member in an axial direction in response to rotation of said drive member by said motor.

7. A disc brake assembly as claimed in claim 3, wherein said caliper is of the single-sided reaction type, said piston is keyed to said friction member to prevent said piston from rotating, and said caliper is adapted to move bodily in an axial direction to apply a second friction member to an opposite face of said disc as said piston moves towards said disc in a brake-applying direction.

8. An electrically-operated disc brake assembly for vehicles with a rotatable brake disc, comprising:
    a friction member is adapted to be applied to the rotatable brake disc;
    an electric motor having an armature;
    a brake caliper having a limb with a bore defined therein;
    a piston disposed in said bore and adapted to apply said friction member to a face of the rotatable brake disc, said piston being keyed against rotation in said bore and defining an internal screw thread; and
    a linear actuator adapted to apply an axially-directed brake-applying force to said friction member in response to operation of said motor, said linear actuator further comprising:

a nut fixed with respect to said limb;

a drive member of differential outline keyed to said armature of said electric motor, said drive member defining threads on a first axially extending screw portion of smaller diameter screwed through said stationary nut, and defining threads on a second axially extending screw portion of greater diameter in screw-threaded engagement with said piston, the threads on said first and second portions being of different pitch, said linear actuator thereby defining a pair of differential screws arranged concentrically about a common axis.

9. A disc brake assembly as claimed in claim 8, wherein the pitch of the threads of said first portion is greater than that of the threads of said second portion to achieve a resultant movement of the piston in an axial direction upon rotation of said motor armature.

10. A disc brake assembly as claimed in claim 9, in which the pitch of said threads of said first portion is greater than that of said threads of the second portion to achieve a resultant pitch of 0.1 millimeters when said motor armature is rotated.

11. A disc brake assembly as claimed in claim 8, wherein said armature of said motor is a cylindrical outline and surrounds said first portion, and said drive member has a longitudinal extending slot which slidably receives a diametrically extending key to permit relative movement of said drive member in an axial direction in response to rotation of said drive member by said motor.

12. A disc brake assembly as claimed in claim 8, wherein said caliper is of the single-sided reaction type, said piston is keyed to said friction member to prevent said piston from rotating, and said caliper is adapted to move bodily in an axial direction to apply a second friction member to an opposite face of said disc as said piston moves towards said disc in a brake-applying direction.

13. A disk brake assembly as claimed in claim 8, wherein said nut is a threaded bore defined said limb.

* * * * *